(No Model.)
H. H. DURR & H. D. BABCOCK.
ADJUSTING DEVICE FOR CULTIVATORS.
No. 479,754. Patented July 26, 1892.
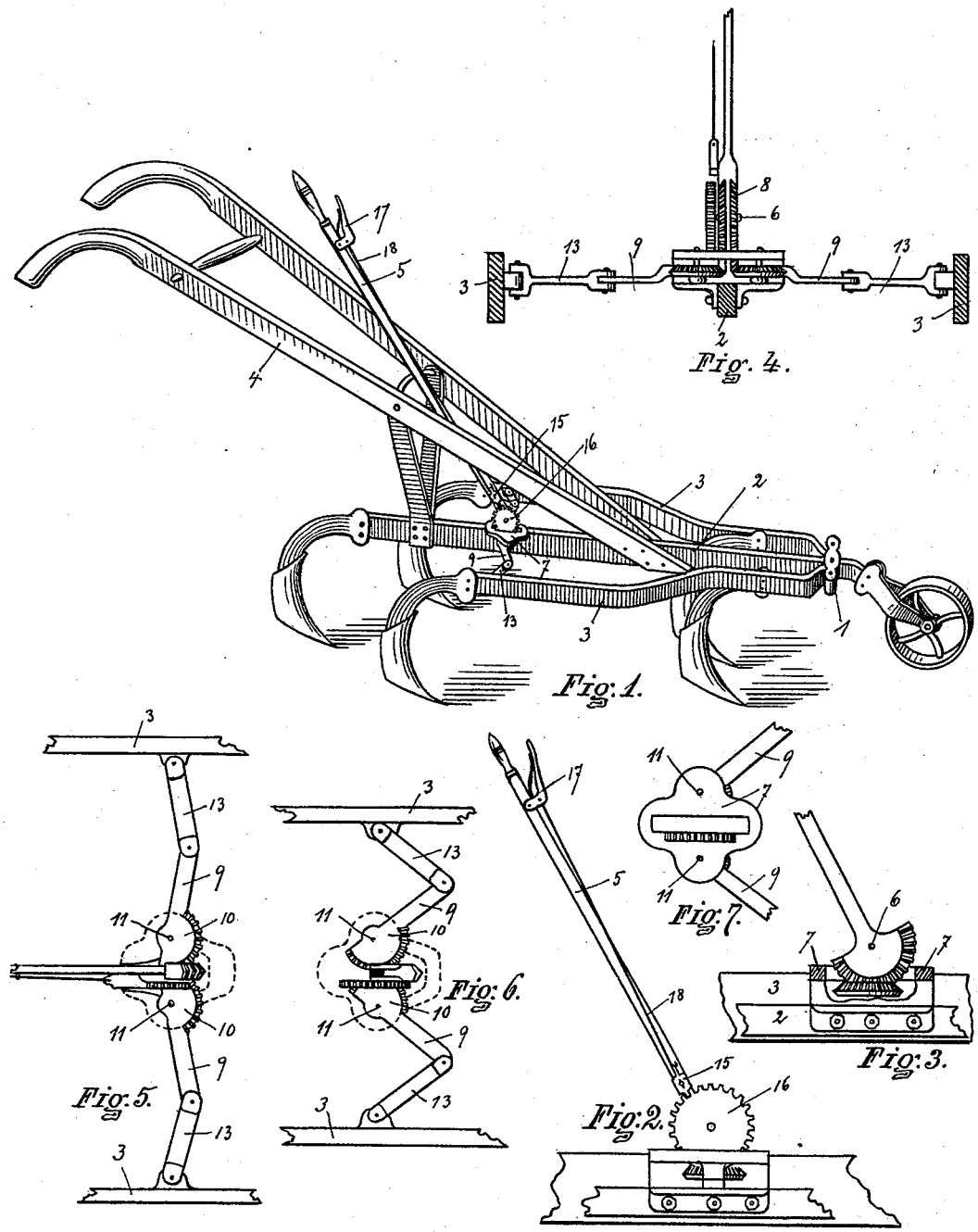
WITNESSES.
Rich. A. George.
M. E. Robinson
INVENTORS:
Henry H. Durr
Henry D. Babcock
By Risley & Love
Attys

UNITED STATES PATENT OFFICE.

HENRY H. DURR, OF UTICA, AND HENRY D. BABCOCK, OF LEONARDSVILLE, ASSIGNORS, BY DIRECT AND MESNE ASSIGNMENTS, TO SAID BABCOCK, AND CHAS. H. CHILDS & CO., OF UTICA, NEW YORK.

ADJUSTING DEVICE FOR CULTIVATORS.

SPECIFICATION forming part of Letters Patent No. 479,754, dated July 26, 1892.

Application filed February 15, 1892. Serial No. 421,646. (No model.)

*To all whom it may concern:*

Be it known that we, HENRY H. DURR, of Utica, Oneida county, and HENRY D. BABCOCK, of Leonardsville, in the county of Madison, State of New York, have invented certain new and useful Improvements in Adjusting Devices for Cultivators; and we do hereby declare that the following is a full, clear, and exact description of the invention, which will enable others skilled in the art to which it appertains to make and use the same, reference being had to the accompanying drawings, and to the figures of reference marked thereon, which form part of this specification.

Our invention relates to an adjusting device for cultivators.

In the drawings which accompany and form part of this specification, and in which similar figures of reference refer to corresponding parts in the several figures—

Figure 1 shows in perspective a cultivator having our improvements applied. Fig. 2 shows the improvements in detail from the side. Fig. 3 shows the end of the adjusting-lever and segmental gears in which it engages. Fig. 4 shows the adjusting devices from the front. Fig. 5 shows a plan view of the working parts in open or extended position. Fig. 6 shows the same in another position. Fig. 7 shows a plan view of the plate on which the adjusting devices are mounted, together with the securing-rack.

Referring more specifically to the reference-numerals marked on the drawings in a more specific description of the device, 1 indicates the cultivator provided, as usual, with a center beam 2 and outer beams 3 3, the outer beams being adjustable. To the center beam 2 is attached the handles 4; also, mounted on the center beam are the adjusting devices, which consist of a lever-handle 5, pivoted at 6 to a plate or bracket 7, secured on the center beam 2. On the lower end of the lever 5 is provided a two-faced beveled segmental gear 8, which is adapted to engage by its respective faces to adjusting-arms 9, provided with segmental bevel-faced gears 10 and pivoted at 11 to the bracket 7. The free or swinging end of the arm 9 is pivotally connected at 12 to link 13, which in turn is pivoted at its outer end at 14 to the adjustable outer beam 3 of the cultivator. The ends of the link 13 are preferably forked where they are connected with the arm 9 and outer frame-bars to provide against vertical displacement. On the lever 5 is provided a movable spring-actuating catch 15, adapted to engage with circular rack 16, which is secured upon or forms a portion of bracket 7. The catch 15 is operated by a bell-crank handle 17 on the outer end of the lever 5, to which it is connected by a connection 18.

The operation of the device is very simple and is as follows: The bell-crank handle 17 being operated to disengage catch 15 from rack 16, the operator then moves the lever 5 to or from him as he stands at the handles 4 and adjusts the cultivator in width according to the direction in which he moves the handle 5. As the handle is brought toward the operator as he stands at the handle 4, the cultivator is widened, and as the handle is moved from the operator it is narrowed by the action of the arm 9 and link 13, together with the gear-sectors mounted on the base of the arm and the gear-sector mounted on the lower end of the lever.

It is evident that the device may be varied in several particulars without departing from the equivalents of our construction.

What we claim as new, and desire to secure by Letters Patent, is—

1. The combination, in a cultivator, of middle and adjustable side beams, segmental gears 10 10, having arms 9 9, respectively, and pivoted on bracket 7, secured to the middle beam, links 13 13, connecting the swinging ends of the arms with the adjustable side beams, a double-faced segmental gear 8, pivoted on bracket 7 and having lever-handle 5, a catch on the lever, and a semicircular rack 16 on the bracket 7, adapted to be engaged by the catch, substantially as set forth.

2. In an adjusting device for a cultivator, the combination of a pair of swinging arms pivotally connected with a beam of the cultivator and lying in the same plane with the beams, each arm provided with a segmental gear concentric with the pivotal point thereof, links connecting the swinging ends of the arms with the adjustable beams of the cultivator, a vertical pivoted segmental gear meshing with the two gears of the arms, an operating-lever connecting with the vertical pivoted sector, a catch on the lever, and a rack adapted to be engaged by the catch, substantially as set forth.

In witness whereof we have affixed our signatures in presence of two witnesses.

HENRY H. DURR.
HENRY D. BABCOCK.

Witnesses:
M. E. ROBINSON,
H. W. BOOTH.